Oct. 14, 1969    C. L. MOON    3,472,214
FUEL HEATING APPARATUS
Filed Sept. 22, 1967    2 Sheets-Sheet 1

INVENTOR.
CHARLES L. MOON
BY
Watts, Hoffmann, Fisher & Heinke
ATTORNEYS.

INVENTOR.
CHARLES L. MOON
BY
Watts, Hoffmann, Fisher & Heinke
ATTORNEYS.

United States Patent Office 3,472,214
Patented Oct. 14, 1969

3,472,214
FUEL HEATING APPARATUS
Charles L. Moon, Brecksville, Ohio, assignor to White Motor Corporation, Cleveland, Ohio, a corporation of Ohio
Filed Sept. 22, 1967, Ser. No. 669,840
Int. Cl. F02m 31/14; F01p 3/12; G05d 23/01
U.S. Cl. 123—122               13 Claims

ABSTRACT OF THE DISCLOSURE

Apparatus for heating fuel to be supplied to an internal combustion engine including a ful supply conduit formed at least in part by a heat exchanger, a fuel passageway for bypassing fuel around the heat exchanger, a valve for controlling the flow of fuel through the heat exchanger and bypass passageway and a thermally responsive actuator for the valve which controls positioning of the valve in response to fuel temperatures downstream of the bypass and thereby causing the valve to modulate the heating of the fuel in response to the temperature of the fuel being supplied to the engine.

BACKGROUND OF THE INVENTION

Field of the invention

The present invention relates to fuel systems and more particularly relates to apparatus for heating fuel which is supplied to combustion equipment.

Fuel oil used in conjunction with various types of combustion equipment is known to exhibit relatively significant changes in viscosity as its temperature varies. This adversely affects the performance of an engine operating on fuel oil.

Due to the construction of fuel-injection equipment used in conjunction with diesel engines, one or more fuel filters are generally provided in a fuel supply line for the engine to remove foreign matter which may be entrained in the fuel. The foreign matter is removed before the fuel in introduced into the injection equipment so that the fuel-injection system of the engine is not fouled or otherwise damaged by such matter. During winter weather, No. 2 fuel oil tends to form ice crystals and wax at relatively low temperatures. When used in conjunction with a diesel engine, the ice crystals and wax formed in the fuel tends to clog the fuel filters. It also adversely affects the operation of fuel-injection equipment associated with the engine.

Because of these injection and filter plugging problems, No. 2 fuel oil, in many instances, has been replaced by No. 1 fuel oil during seasons of the year in which relatively low temperature operation of the engine can be expected. No. 1 fuel oil is not a fully satisfactory solution both because it is more expensive and because it has a lower heating value than that of No. 2 fuel oil. Thus, the use of No. 1 fuel oil reduces the power available from the engine. In some cases, blends of No. 2 and No. 1 fuel oil are utilized, but such blends do not produce the heating value of No. 2 fuel oil. Moreover, blends of No. 2 and No. 1 fuel oil, as well as No. 1 fuel oil itself, are not always commercially available. In other cases, anti-wax additives and pour point depressants have been added to the fuel during cold seasons of the year.

Another practice which has been developed to avoid the above-noted problem is seasonal adjustment of the fuel systems for diesel engines which permits such engines to perform on No. 1 fuel oil during cold weather. Seasonal adjustments of such an engine requires adjustment of fuel systems, pumps, and injectors, among other things. Such seasonal adjustments are costly, not only from the standpoint of the labor involved, but also as a result of downtime of the equipment during adjustment. Moreover, modification of the filter system as a part of such seasonal adjustment can result in poor filter performance.

The prior art

While the above-noted problems have been discussed in reference primarily to diesel engines and particular fuel oils, the prior art has recognized heating of fuels may be desirable. One proposal for fuel heating was for a system wherein fuel may be supplied directly to combustion chambers of an engine during average or relatively high ambient temperature operation of the engine and in which the fuel to be supplied to the combustion chambers is channeled through a suitable heat exchanger when ambient temperatures are relatively low. In such systems, however, all of the fuel to be supplied to the engine, at low temperatures, is passed through a heat exchanger, and the fuel is heated in an uncontrolled maner.

Proposals for controlling the temperature of the heated fuel by controlling the amount of heat absorbed by the fuel have been made. One approach was to circulate relatively hot engine coolant through a heat exchanger to transfer heat to a liquid fuel being supplied to an engine. With this proposal a thermostatic valve is connected in the engine coolant system to control the flow of engine coolant through the fuel heating heat exchanger in response to coolant temperature. With another proposal, the flow of engine coolant to a fuel-heating heat exchanger would be modulated in response to fuel temperature.

Proposals such as those described have not proved entirely satisfactory in all cases due to the lag in response of the valve varying the flow of engine coolant, and problems inherent in valving engine coolant flow in a controlled manner which are well-known. Moreover, the temperature of such a heat exchanger can only change very slowly when the flow of the warm coolant is controlled. This can result in excessive heating and will result in ununiform heating.

For example, if a vehicle is stopped for a traffic light little fuel is flowing and the heating of it will be maximiped. Upon acceleration from the stopped position, fuel flow will be high with a resultant poor heating of it. Thus, the prior proposals which attempt to control the temperature of the heat exchanger are inherently sluggish. This sluggishness results in poor performance at the time it is needed most, when the vehicle accelerates.

SUMMARY OF THE INVENTION

In accordance with the present invention, fuel heating apparatus for a fuel supply system is provided with a heat exchanger exposed to a source of heat energy to heat the fuel. Portions of fuel in the system are subjected to the heat exchanger in amounts sufficient to insure a desired fuel temperature when the fuel system is exposed to low atmospheric temperatures.

The preferred arrangement embodying the present invention is a fuel heating heat exchanger and a bypass fuel passageway for directing fuel around the heat exchanger. A control valve for controlling the amount of fuel heated by the heat exchanger is provided so that a predetermined desired fuel temperature is produced. Such a device is simple in construction, quickly responsive to changing heat requirements of the fuel, and eliminates the necessity of seasonal adjustment of equipment associated with the fuel supply system, the use of fuel additives, or substitution of fuels to adapt the system to low temperature operation.

In carrying out the present invention, a fuel conduit is provided between a fuel tank and engine. The conduit includes the heat exchanger and the bypass for directing fluid around the heat exchanger. The control valve is a thermostatic valve which modulates the flow of fuel through the heat exchanger and bypass in response to the temperature of fuel downstream from them. The thermostatic valve includes a valve member operable at one extreme position to close off the bypass passageway so that all of the fuel flowing from the tank to the engine passes through the heat exchanger, and at its other extreme position to close off the fuel flow path through the heat exchanger so that all of the fuel flows to the engine through the bypass passageway and is thus unheated. The valve member is operated by a thermally responsive actuator responsive to the temperature of the fuel downstream of the bypass to control positioning of the valve member and provide for temperature control of the fuel.

Accordingly, the object of the invention is to provide a novel and improved fuel heating system.

Other objects and a fuller understanding of the invention may be had by referring to the following detailed description thereof and claims, in conjunction with the accompanying drawings.

Figure 1:
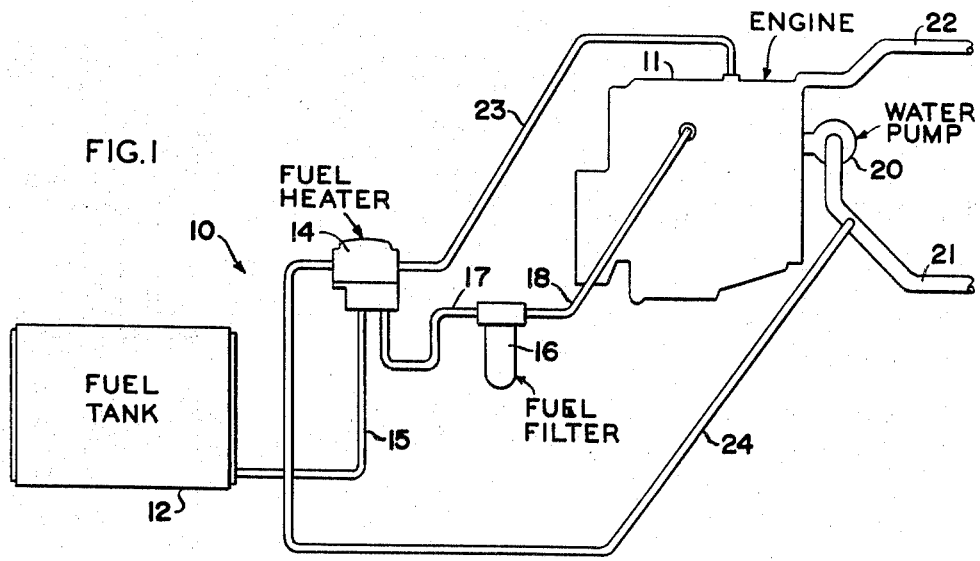
FIGURE 1 is a schematic representation of an internal combustion engine and fuel supply system embodying the present invention.

A fuel supply system 10 for an internal combustion engine 11, preferably of the diesel type, is illustrated in FIGURE 1. The system includes a fuel tank 12 and a fuel conduit to the engine. The conduit includes fuel heating apparatus 14 connected to the tank 12 by a fuel supply line 15, a fuel filter 16 connected to the fuel heating apparatus 14 by way of a fuel line 17, and a fuel supply line 18 for delivering fuel from the filter 16 to the engine 11.

The illustrated engine is of the liquid cooled type and includes a coolant pump 20 which receives relatively low temperature coolant from a hose 21 connected to the outlet of a radiator, not shown, and which is operable to circulate the coolant through suitable passages in the engine. The coolant is returned from the engine to the radiator through a hose 22, in the usual manner. The coolant pump 20 is also effective to circulate engine coolant which has been heated in the engine from the block of the engine 11 through a conduit 23. The conduit 23 conducts the heated coolant to the fuel heating apparatus 14. A conduit 24 connects the heating apparatus 14 to the hose 21 at the low pressure side of the pump 20.

The high temperature coolant circulating through the fuel heating apparatus 14 via the hoses 23, 24 provides a source of heat energy for heating fuel flowing through the apparatus 14 to the engine 11. During low ambient temperature operation of the engine, the fuel which flows through the filter 16 and lines 17, 18 to the engine is maintained within a relatively narrow temperature range which is higher than the ambient temperature, as is described in greater detail presently.

Figure 2:
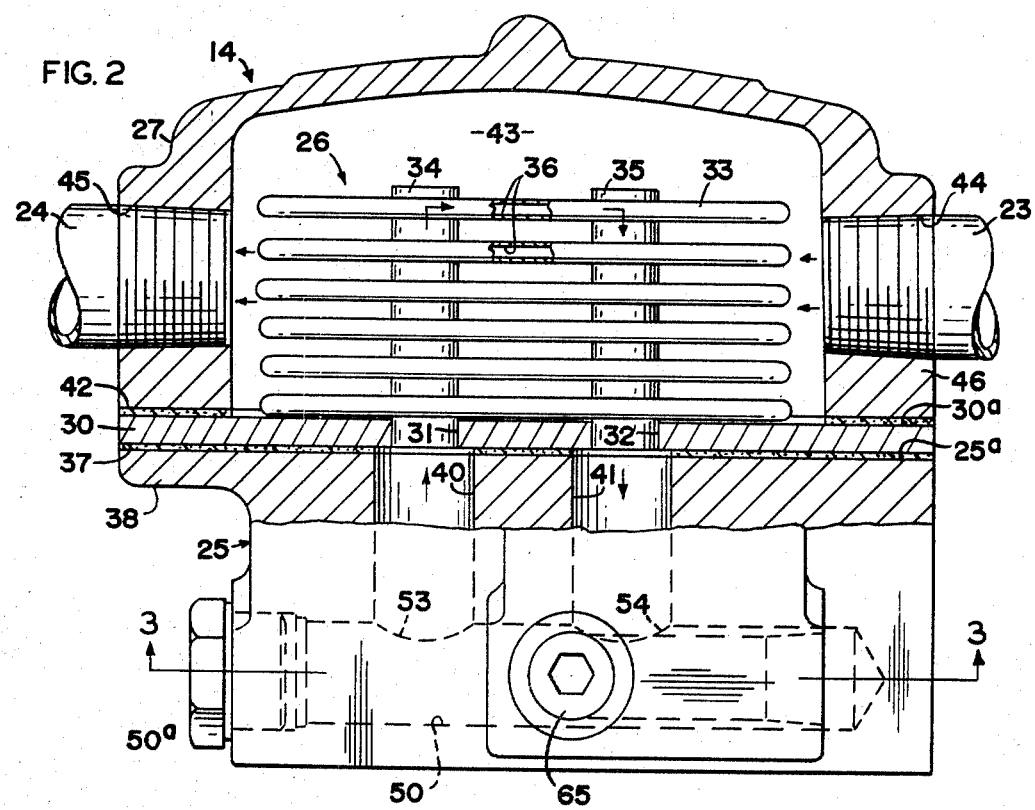
FIGURE 2 is an elevational view of fuel heating apparatus utilized in the system of FIGURE 1, shown on a scale which is enlarged from the scale of FIGURE 1 and with parts in section.

As illustrated in FIGURE 2, the fuel heating apparatus 14 includes a body member 25 formed by a casting of suitable metallic material, a heat exchanger assembly 26, and a coolant jacket 27 surrounding the heat exchanger assembly. The body member 25 includes a thermostatic valve and fuel passageways described in detail presently, which are in communication with the heat exchanger assembly 26 and the fuel lines 15, 17.

The heat apparatus 14 also includes a plate member 30 having openings 31, 32. The heat exchanger assembly 26 includes headers, or tubular members 34, 35, the open ends of which are fixed in the openings 31, 32. These headers are connected to heat exchange elements 33 of suitable construction. In the illustrated embodiment the elements 33 are a plurality of hollow metallic disc-like members having relatively large internal and external surface areas which receive fuel from the header 34 and direct the fuel into the header 35. Thus, fuel passageways generally designated at 36 are defined by the heat exchanger elements 33.

The heat exchanger assembly 26 and a gasket 37 are assembled to a support flange 38 forming a side of the body member 25. The openings 31, 32 in the plate member 30 are aligned with corresponding openings in the gasket 37 and bores 40, 41 in the body member 25 which open in an upper surface 25a (as viewed in the drawings) of the body member 25. The bores 40, 41 communicate with the thermostatic valve and passages in the body member 25. These passages will be described presently in greater detail in their relation to the heat exchanger assembly and body 25.

The coolant jacket 27 is formed by a cup-like member which is assembled with a gasket 42 upon a surface 30a of the plate member 30 to define a chamber 43 about the heat exchanger 33. The chamber 43 communicates with the coolant hoses 23, 24 of the engine coolant system by way of suitable openings 44, 45 formed at opposed locations in wall 46 of the coolant jacket. Thus, heated engine coolant is directed through the chamber 43 and into heat exchange relationship with the heat exchanger assembly 26 whenever the engine 11 is being operated. The coolant jacket 27 and heat exchanger assembly 26 are attached to the support flange 38 by suitable fasteners such as the screws 47 (see FIGURES 3 and 4) which compressively urge the aforementioned parts of the apparatus together in a fluid tight manner.

Figure 3:
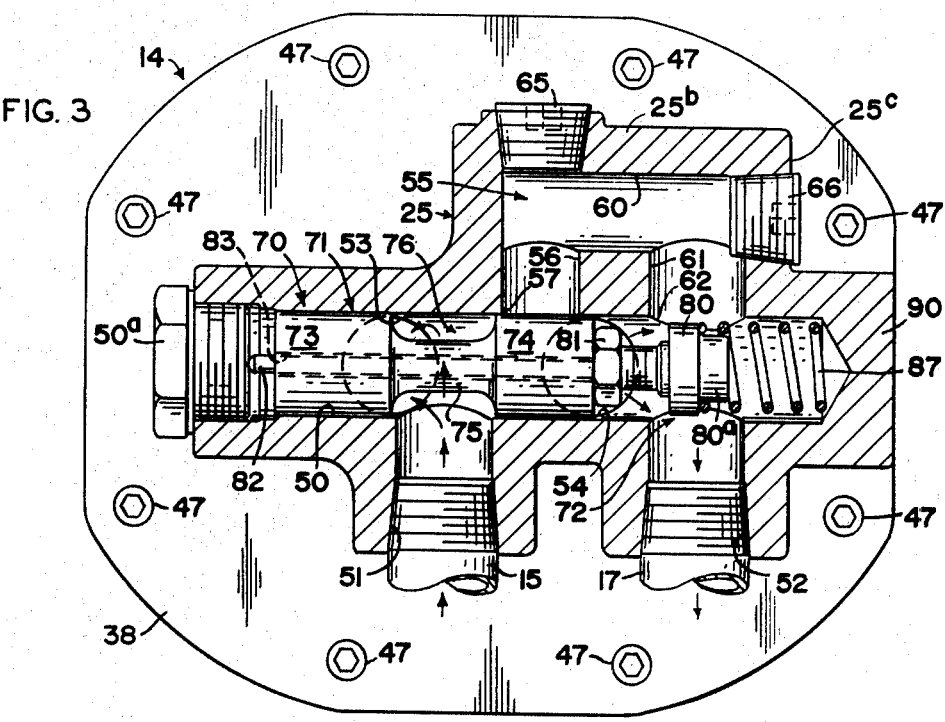
FIGURE 3 is a sectional view as seen from the plane indicated by the line 3—3 of FIGURE 2 showing the control in one operative condition; and, FIGURE 4 is a view similar to FIGURE 3 showing the control valve fuel heating apparatus in another operative condition.
Figure 4:
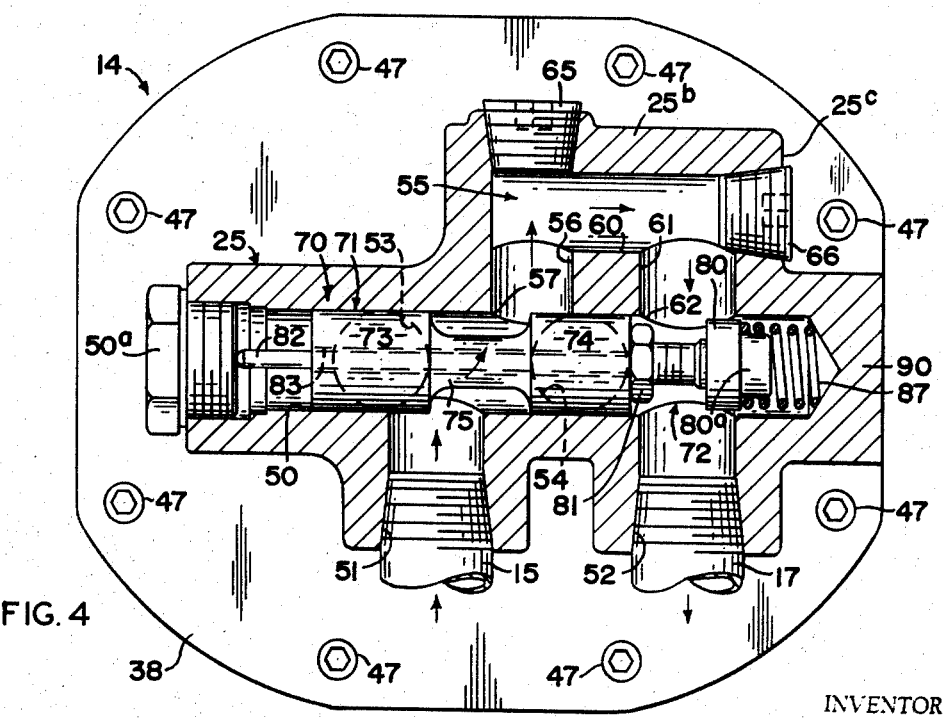

Referring to FIGURES 3 and 4, the body member 25 includes a generally cylindrical valve chamber 50. The valve chamber 50 is defined by a bore extending through an end of the body 25. An assembly plug 50a is threadably received in the bore to provide an end wall of the chamber 50.

The chamber 50 communicates with the fuel line 15 through an inlet passage 51 in the body 25, and with the fuel line 17 through an outlet passage 52 formed in the body 25. The inlet and outlet passages 51, 52 are generally cylindrical and the external openings are provided with threads for reception of the fuel lines 15, 17 in a fluid tight manner.

The bores 40, 41 extend from the upper surface 25a of the body 25 to the valve chamber 50 and define ports 53, 54 in the valve chamber. Fuel flows, under conditions described presently, from the inlet passage 51 through the valve chamber 50 through the port 53, into the bore 40.

The fuel flows from the bore 40 through the header 34 and then through the fluid passageways 36 in the heat exchanger assembly 26. The fuel then exits through the header 35, the bore 41, the port 54, through the chamber 50 into the outlet passage 52. It is apparent from the foregoing description that fuel flowing through the passageways 36 is heated by the engine coolant circulating in the chamber 43 surrounding the heat exchanger assembly during its pass through the apparatus 14.

The body member 25 additionally includes a bypass 55 for conducting the fuel around the heat exchanger assembly 26. The bypass 55 includes a flow passageway 56 which defines a bypass inlet port 57 from the valve chamber 50. The bypass inlet opens into a passageway 56 which is connected to a flow passageway 60. The flow passageway 60 connects with a passageway 61 extending between the passageway 60 and an outlet port 62. The outlet port 62 connects the bypass to the valve chamber 50 at a location axially aligned with the chamber outlet passage 52.

The passageway 56 is formed by a cylindrical drill hole extending through a side wall 25b of the body 25 and the valve chamber 50 with the opening in the side wall 25b being threaded for reception of a suitable sealing screw 65. The passageway 60 is formed by a cylindrical drilled hole extending through an end wall 25c of the body 25 and into communication with the passageways 56, 61. The drilled hole 60 in the end wall 25c is closed by a suitable sealing screw 66. From the above description it should be appreciated that fuel flowing through the fuel heating apparatus 14 from the fuel line 15 to the fuel line 17 may flow through the fuel passageway 36 to be heated in the heat exchanger assembly 26, or through the bypass passageway 55, remaining unheated, or through both passageways.

The amount of fuel flowing through the passageways 36, 55 is modulated by thermostatic valve assembly 70 to control the temperature of fuel to be introduced into the engine 11. The valve assembly includes a valve member 71 disposed in the valve chamber 50 and thermally responsive actuating assembly 72. The actuating assembly 72 controls the valve member 71 in response to the temperature of fuel flowing into the outlet passage 52.

The valve member 71 is illustrated as an axially shiftable spool valve having spaced, cylindrical land portions 73, 74 which are in sliding engagement with the wall of the chamber 50. The land portions 73, 74 are separated by a reduced diameter portion 75 providing a circumferential groove 76 in the valve member 71. The groove 76 has sufficient axial length for communication with the inlet passage 51 throughout the range of movement of the valve member 71.

When the engine 11 is operated at low ambient temperatures, the fuel temperature in the outlet 52 is sufficiently low that the valve member 71 is in its position illustrated in FIGURE 3. With the valve member in this position, fuel flowing through the inlet passage 51 is directed through the port 53, heat exchanger assembly 26 and to the line 17 through the outlet passage 52. Fuel flow through the bypass passageway 55 is blocked by the land 74 which covers the inlet port 57 of the bypass 55. Thus, all of the fuel flowing through the apparatus 14 is heated by the engine coolant in the chamber 43 when the apparatus is in its condition illustrated in FIGURE 3.

Conversely, when the temperature of fuel being supplied to the apparatus 14 is relatively high, fuel temperature at the outlet 52 is high and the valve member 71 is maintained in its position illustrated in FIGURE 4. In this condition, fuel flows from the fuel line 15 through the inlet 51 and is bypassed around the heat exchanger passageway 36 through the bypass 55. At this time, the land 73 blocks the inlet port 53 to the heat exchanger assembly 26. In the illustrated embodiment, the land 74 of the valve member 71 covers the outlet port 54 of the heat exchanger passageway 36 when the valve member is in its position shown in FIGURE 4. Such construction is not essential in blocking the heat exchanger passageway. It is only essential that one or the other of the ports 53, 54 be blocked when the valve is in its FIGURE 4 position.

It is apparent that when the valve member 71 is between the aforementioned extreme positions illustrated in FIGURES 3 and 4, the fuel flow is split so that a portion of the fuel passes through the heat exchanger assembly 26 and the remainder of the fuel passes through the bypass 55 with the heated and unheated fuel being mixed in the outlet passage 52. Positioning of the ports of the passageways 36, 55 in the valve chamber 50 and dimensions of the lands 73, 74 and groove 76 of the valve member 71 and the various passageways are related so that the maximum expected fuel flow is handled by the apparatus 14 with low flow impedance for any given flow modulating position of the valve member 71.

The thermally responsive actuating assembly 72 includes a suitably constructed power element 80 fixed to the end of the valve member 71 adjacent the land 74, by a suitable fastener, such as the jam nut 81. The power element 80 may be of any suitable construction, but in the preferred embodiment is of the wax or liquid filled type. In this type, a thermally expansible and contractible wax-like substance, or liquid, is contained within a body 80a defining an enclosed chamber. The substance is effective to increase its volume upon an increase in temperature ambient the body to effect movement of a push rod or piston element 82 relative to the body.

The body 80 is normally disposed in the flow path of fluid passing through the bypass 55, and, as best seen in FIGURE 3, is adjacent the outlet port 54 of the heat exchanger assembly 26. Thus, heated fuel is directed from the port 54 across the body 80 and into the outlet passage 52 as illustrated in the figure by flow arrows. It is apparent that the fuel temperature to which the power element responds is that of the fuel downstream of the bypass 55 and may be the temperature of mixed bypass and heated fuel, or the temperature of either unheated bypass fuel or heated fuel as the case may be when the valve member is in one of its extreme positions.

The piston element 82 of the power element 80 projects through an axial bore 83 in the valve member 71 and into engagement with a surface of the assembly plug 50a. The right side of the power element 80 is supported in the valve chamber 50 by a helical spring 87 compressed between the power element 80 and an end wall 90 of the valve chamber 50.

When the temperature of the fuel in the outlet passage 52 increases, the thermally responsive substance in the power element 80 expands urging the piston element 82 toward the left, as viewed in FIGURE 3. Since the piston element 82 is firmly engaged by the assembly plug 50a, the power element 80 and valve member 71 are forced to the right as a unit against the bias of the spring 87. Thus, the valve member 71 modulates the fuel flow through the apparatus 14 by reducing the flow of fuel through the heat exchanger assembly 26 while increasing the flow through the bypass passageway 55 by corresponding amounts as described previously. Reduction in flow of heated fuel and increased bypass flow reduces the sensible temperature at the power element 80 tending to slow or stop movement of the valve member 71 at a position which provides a predetermined maximum desired fuel temperature to the engine 11. In the event that fuel temperature at the outlet 52 of the apparatus 14 decreases below the predetermined temperature, the volume of the substance in the body 80a of the power element 80 is reduced and the spring 87 urges the valve member 71 and power element 80 to a positon in which a greater volume of the fuel is heated in the heat exchanger assembly 26 and the fuel temperature at the outlet 52 is returned to its desired level.

When the apparatus 14 is utilized in conjunction with an engine having varying power output requirements, such as a prime mover for a vehicle, it is apparent that the flow rate of fuel, and the temperature and flow rate of the engine coolant will vary with the engine power requirements. Thus, in such an environment and at low ambient air temperature, the valve member 71 may never be completely static in the valve chamber, but will substantially maintain the fuel temperature within a very small range as it seeks a position at which the predetermined temperature is provided.

With diesel engine powered highway tractors the preferred fuel temperature range is from 80° to 102° F. Thus, whenever the fuel system temperature is 80° F. or lower, all of the fuel flowing through the apparatus 14 is heated, while fuel temperatures of 102° F. result in fuel flow in the apparatus being bypassed from the heat exchanger. Different temperature ranges and desired maximum fuel temperatures can be provided by selection of appropriate thermally responsive actuators for the valve member.

While a single embodiment of the present invention has been illustrated and described herein in considerable detail, the invention is not to be considered to be limited to the precise construction disclosed.

What is claimed is:

1. Apparatus for controlling the temperature of fuel flowing in a fuel supply line comprising:
   (a) structure defining fuel inlet and outlet passages;
   (b) a fuel heating heat exchanger including heat exchange surfaces defining a fuel passageway communicating with said inlet and outlet passages;
   (c) fluid conduction means defining a bypass passageway communicating with said inlet and outlet passages and effective to bypass fuel around said heat exchanger; and,
   (d) thermostatic valve means for modulating the flow of said fuel through said passageways in response to temperature of mixed bypassed and heated fuel in said outlet passage.

2. Apparatus as defined in claim 1 wherein said thermostatic valve means includes a valve member which is movable to control the amount of fuel flowing in said passageways and thermally responsive actuating means for said valve member, said actuating means including a thermally expansible and contractible substance in heat transfer relationship with said mixed heated and bypassed fuel in said outlet passage.

3. Apparatus as defined in claim 2 wherein said valve member is a generally cylindrical spool valve disposed in a chamber and having spaced surfaces for valving the fuel flow to said passageways in response to axial movement of the valve member relative to the chamber.

4. Apparatus as defined in claim 3 wherein said thermally responsive actuating means includes a first part fixed to said valve member and a second part operative to provide an axially directed actuating force on said valve member.

5. Apparatus as defined in claim 4 wherein said second part of said actuating means includes a member having a surface engageable with a wall of said chamber with relative movement between said first and second parts effecting axial movement of said valve member in said chamber.

6. Apparatus as defined in claim 4 wherein said actuating means further includes spring means opposing said axial force.

7. Apparatus for heating fuel in a fuel supply system for an internal combustion engine comprising:
   (a) a body member having a fuel inlet passage therein for receiving a flow of fuel from a fuel supply line of said system and a fuel outlet passage for directing said flow of fuel from the apparatus into a second fuel supply line of said system;
   (b) a heat exchanger assembly connected to said body member;
   (c) a fuel passageway defined by said heat exchanger and communicating with said inlet and outlet passages;
   (d) a bypass passageway defined by said body member and communicating with said inlet and outlet passages to bypass fuel from said heat exchanger passageway;
   (e) said passageways directing heated and bypassed fuel into mixing relationship in said outlet passage;
   (f) a valve member movably disposed in said body member and movable between a first position wherein fuel flow through said bypass passageway is blocked and the fuel flowing in said system passes through said heat exchanger passageway to be heated, and a second position wherein the fuel in said system passes through said bypass passageway; and,
   (g) actuating means for positioning said valve member to provide a quantity of fuel flow through said heat exchanger passageway which is sufficient to maintain the mixed fuel in said outlet passageway at a predetermined maximum temperature.

8. Apparatus as defined in claim 7 wherein said actuating means includes a member movable to effect movement of said valve member in one direction of movement in response to a change of fuel temperature of one sense in said outlet passage and biasing means opposing movement of said valve member in said direction and effecting movement of said valve member in an opposite direction of movement in response to a fuel temperature change of opposite sense in said outlet passage.

9. Apparatus as defined in claim 7 and further including means for providing a source of heat energy into heat exchange relationship with fuel in said heat exchanger passageway.

10. Apparatus as defined in claim 9 wherein said last mentioned means includes a coolant jacket defining a chamber about said heat exchanger which communicates the coolant system of said engine, said coolant flowing in a substantially unrestricted manner through said chamber.

11. In combination:
   (a) an internal combustion engine including a coolant circulating system;
   (b) a heat exchanger;
   (c) conduit means connecting the coolant system to the heat exchanger to circulate coolant through the heat exchanger whenever coolant is circulated in the system;
   (d) a fuel tank;
   (e) fuel supply and engine supply conduits connected respectively to the tank and the engine;
   (f) structure defining a by-pass passageway;
   (g) a valve connected to the supply conduits, the heat exchanger and the by-pass passageway;
   (h) thermostatic control means for sensing the temperature of fuel in the engine supply conduit and to control the valve in response to the temperature of fuel in said engine supply conduit; and,
   (i) said valve having:
      (i) a first position connecting the supply conduits through the passageway and shutting off the heat exchanger;
      (ii) a second position connecting the supply conduits through the heat exchanger and shutting off the by-pass; and,
      (iii) a third position connecting the supply conduits through both the heat exchanger and the by-pass thereby mixing heated and unheated fuel.

12. The combination of claim 11 wherein the heat exchanger, the by-pass and the valve each form portions of a fuel heater assembly comprising:
   (a) a body member having a body defining a valve chamber and said by-pass passageway;
   (b) a jacket connected to said body and to said coolant system to define a heat exchange cavity; and, (c) a plurality of parallel connected fuel conducting members disposed in the cavity and connected to the valve whereby fuel to be heated is conducted through the members and the members are substantially surrounded by heated coolant when the combination is in use.

13. The combination of claim 11 wherein the heat exchanger includes a jacket and wherein a plurality of parallel connected fuel conducting members are disposed in the cavity and connected to the valve whereby fuel to be heated is conducted through the members and the members are substantially surrounded by heated coolant when the combination is in use.

References Cited

UNITED STATES PATENTS

| 1,318,068 | 10/1919 | Giesler. | |
| 2,033,575 | 3/1936 | Hochreiter et al. | |
| 2,222,721 | 11/1940 | Ramsaur et al. | 165—166 X |
| 2,788,176 | 4/1957 | Andersen | 123—122 X |
| 2,881,828 | 4/1959 | McGinnis | 165—35 X |
| 3,238,998 | 3/1966 | Moore et al. | 165—40 |
| 3,388,861 | 6/1968 | Harding | 137—90 X |

AL LAWRENCE SMITH, Primary Examiner

U.S. Cl. X.R.

123—41.31; 137—625.29; 165—36; 236—93